United States Patent
Kayama

(10) Patent No.: US 12,251,691 B2
(45) Date of Patent: Mar. 18, 2025

(54) EXHAUST GAS PURIFICATION FILTER

(71) Applicant: DENSO CORPORATION, Kariya (JP)

(72) Inventor: Hiroaki Kayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 748 days.

(21) Appl. No.: 17/451,826

(22) Filed: Oct. 22, 2021

(65) Prior Publication Data

US 2022/0042436 A1 Feb. 10, 2022

Related U.S. Application Data

(63) Continuation of application No. PCT/JP2020/011409, filed on Mar. 16, 2020.

(30) Foreign Application Priority Data

Apr. 26, 2019 (JP) .................................. 2019-086489

(51) Int. Cl.
*B01J 23/42* (2006.01)
*B01J 23/44* (2006.01)
*B01J 23/46* (2006.01)
*B01J 35/56* (2024.01)
*B01J 35/63* (2024.01)
*B01J 35/64* (2024.01)

(52) U.S. Cl.
CPC ............... *B01J 35/63* (2024.01); *B01J 23/42* (2013.01); *B01J 23/44* (2013.01); *B01J 23/464* (2013.01); *B01J 35/56* (2024.01); *B01J 35/657* (2024.01); *F01N 2570/14* (2013.01)

(58) Field of Classification Search
CPC . B01J 23/42; B01J 23/44; B01J 23/464; B01J 35/56; B01J 35/63; B01J 35/657
USPC ...................................................... 502/527.19
See application file for complete search history.

(56) References Cited

U.S. PATENT DOCUMENTS

| | | | | |
|---|---|---|---|---|
| 8,133,841 | B2 * | 3/2012 | Noda | B01D 46/24492 422/177 |
| 8,470,255 | B2 * | 6/2013 | Mizutani | C04B 35/565 422/177 |
| 9,700,842 | B2 * | 7/2017 | Miyairi | B01J 35/50 |
| 10,883,401 | B2 * | 1/2021 | Ishihara | B01J 35/56 |
| 11,305,270 | B2 * | 4/2022 | Yamada | C04B 41/009 |

(Continued)

FOREIGN PATENT DOCUMENTS

| | | | | |
|---|---|---|---|---|
| EP | 2 236 188 | | 10/2010 | |
| GB | 2551608 | A * | 12/2017 | ......... B01D 46/2418 |
| JP | 8-150340 | | 6/1996 | |

*Primary Examiner* — Cam N. Nguyen
(74) *Attorney, Agent, or Firm* — Nixon & Vanderhye P.C.

(57) ABSTRACT

An exhaust gas purification filter is used so as to support a $NO_X$ purification catalyst. The exhaust gas purification filter includes a honeycomb structure portion and a plug portion. The honeycomb structure portion includes a partition wall and cells. Numerous pores are formed in the partition wall. The cells are partitioned by the partition walls and form a flow path for an exhaust gas. The plug portion alternately seals an inflow end surface or an outflow end surface for the exhaust gas in the cells. The partition wall has a gas permeability coefficient that is equal to or greater than $0.35 \times 10^{-12}$ $m^2$, a pore volume ratio of pore diameters of 9 μm or less that is equal to or less than 25%, and an average pore diameter that is equal to or greater than 12 μm.

10 Claims, 13 Drawing Sheets

(56) References Cited

U.S. PATENT DOCUMENTS

| | | |
|---|---|---|
| 2006/0107641 A1 | 5/2006 | Kasai et al. |
| 2007/0104623 A1 | 5/2007 | Dettling et al. |
| 2007/0196620 A1 | 8/2007 | Ohno et al. |
| 2018/0264453 A1 | 9/2018 | Kuki |

* cited by examiner

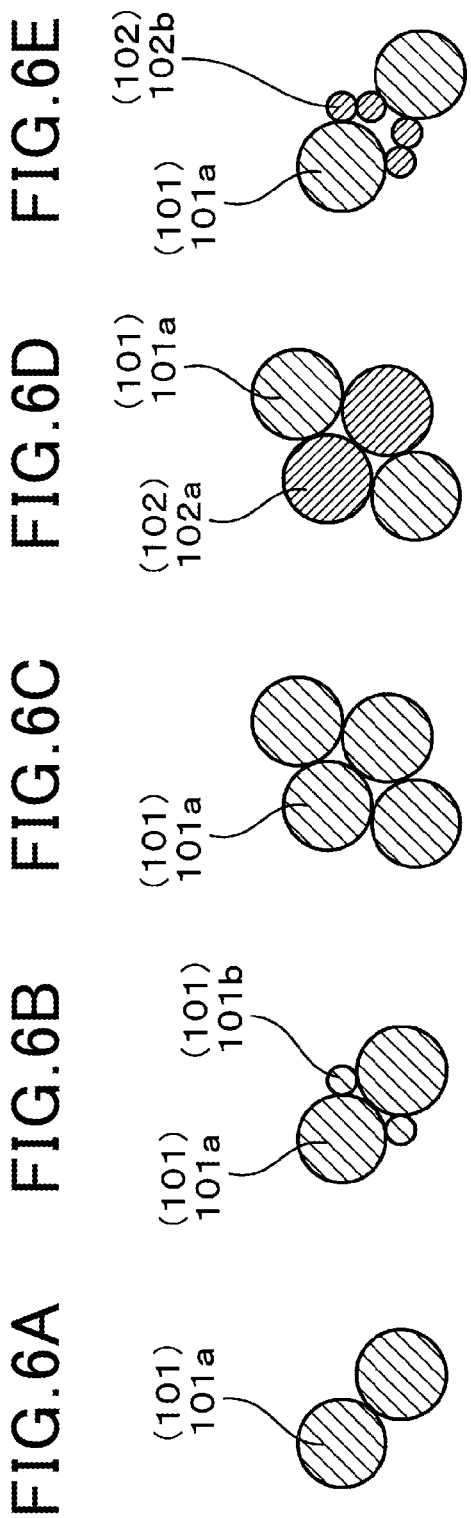

EXHAUST GAS PURIFICATION FILTER

CROSS-REFERENCE TO RELATED APPLICATION

The present application is a continuation application of International Application No. PCT/JP2020/011409, filed on Mar. 16, 2020, which claims priority to Japanese Patent Application No. 2019-086489, filed on Apr. 26, 2019. The contents of these applications are incorporated herein by reference in their entirety.

BACKGROUND

Technical Field

The present disclosure relates to an exhaust gas purification filter that is used so as to support a $NO_X$ purification catalyst.

Related Art

Exhaust gas that is discharged from internal combustion engines, such as diesel engines and gasoline engines, and heat engines, such as boilers, contains particulate matter referred to as particulates. The particulates are referred to, hereafter, as "PM", as appropriate. An exhaust gas purification filter is used to collect the PM in the exhaust gas. The exhaust gas purification filter typically has a plurality of cells that are formed so as to be partitioned by porous partition walls and a plug portion that seals either of both ends of the cell. The exhaust gas purification filter is required to collect the PM that is contained in the exhaust gas inside pores in the partition walls, while reducing pressure loss.

SUMMARY

One aspect of the present disclosure provides an exhaust gas purification filter that is used so as to support a $NO_X$ purification catalyst. The exhaust gas purification filter includes: a honeycomb structure portion that includes a partition wall in which numerous pores are formed, and a plurality of cells that are partitioned by the partition walls and form a flow path for an exhaust gas; and a plug portion that alternately seals an inflow end surface or an outflow end surface for the exhaust gas in the cells. The partition wall has a gas permeability coefficient that is equal to or greater than $0.35 \times 10^{-12}$ m$^2$, a pore volume ratio of pore diameters of 9 μm or less that is equal to or less than 25%, and an average pore diameter that is equal to or greater than 12 μm.

BRIEF DESCRIPTION OF THE DRAWINGS

In the accompanying drawings:

FIGS. 6A to 6E are schematic diagrams of arrangement patterns of raw material particles according to the first embodiment;

DESCRIPTION OF THE EMBODIMENTS

Figure 1:
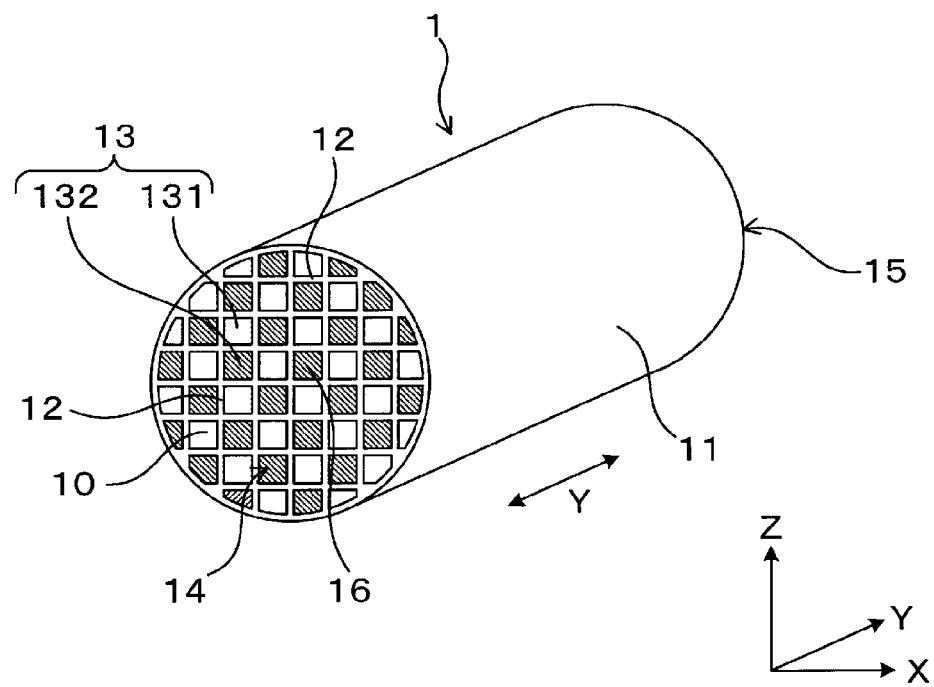
FIG. 1 is a perspective view of an exhaust gas purification filter according to a first embodiment.

For example, Japanese Patent Publication No. 4473693 discloses a filter that has a porosity of 45 to 70%, a predetermined average pore diameter difference rate of 35% or less, an average pore diameter of 15 to 30 μm, and a maximum pore diameter of 150 μm or less, measured by a bubble point method. Based on Japanese Patent Publication No. 4473693, pressure loss during PM accumulation can be reduced through use of the above-described configuration.

In recent years, there has been demand for the exhaust gas purification filter to be provided with purification performance regarding toxic substances such as $NO_X$. For example, the exhaust gas purification filter may support a $NO_X$ purification catalyst. $NO_X$ has a slow diffusion rate in a catalyst layer. Therefore, rather than a catalyst layer being thickly formed, the amount of $NO_X$ is more effectively reduced by the same amount of the catalyst layer being thinly and widely formed.

However, in a conventional exhaust gas purification filter such as that described in Japanese Patent Publication No. 4473693, a narrow portion is formed in a pore in which the catalyst is supported. Flow path resistance of a catalyst slurry increases, and the catalyst layer tends to be formed so as to be partially thick as a result of the catalyst being supported. Therefore, there is room for further improvement in purification performance regarding $NO_X$ in the catalyst layer of the conventional exhaust gas purification filter.

It is thus desired to provide an exhaust gas purification filter that is capable of exhibiting excellent $NO_X$ purification performance by supporting a catalyst.

A first exemplary embodiment of the present disclosure provides an exhaust gas purification filter that is used so as to support a $NO_X$ purification catalyst. The exhaust gas purification filter includes: a honeycomb structure portion that includes a partition wall in which numerous pores are formed, and a plurality of cells that are partitioned by the partition walls and form a flow path for an exhaust gas; and a plug portion that alternately seals an inflow end surface or an outflow end surface for the exhaust gas in the cells. The partition wall has a gas permeability coefficient that is equal to or greater than $0.35 \times 10^{-12}$ m$^2$, a pore volume ratio of pore diameters of 9 μm or less that is equal to or less than 25%, and an average pore diameter that is equal to or greater than 12 μm.

A second exemplary embodiment of the present disclosure provides an exhaust gas purification filter that includes a substrate and a catalyst layer including a nitrogen oxide purification catalyst supported by the substrate. The substrate includes: a honeycomb structure portion that includes a partition wall in which numerous pores are formed, and a plurality of cells that are partitioned by the partition walls and form a flow path for an exhaust gas; and a plug portion that alternately seals an inflow end surface or an outflow end surface for the exhaust gas in the cells. The partition wall has a gas permeability coefficient that is equal to or greater than $0.35 \times 10^{-12}$ m$^2$, a pore volume ratio of pore diameters of 9 μm or less that is equal to or less than 25%, and an average pore diameter that is equal to or greater than 12 μm. The catalyst layer is supported on the partition wall of the substrate. A supported amount of the catalyst layer is 30 to 150 g/L. An average thickness of the catalyst layer is equal to or less than 6 μm.

In the exhaust gas purification filter according to the above-described exemplary embodiments, the gas permeability coefficient of the partition wall, the pore volume ratio of pore diameters of 9 μm or less of the partition wall, and the average pore diameter of the partition wall are adjusted as described above. In such a partition wall, because flow path resistance of the pores is small, a catalyst layer is thinly and widely formed by the $NO_X$ purification catalyst being supported. As a result, $NO_X$ that has a slow diffusion rate is efficiently reduced. Consequently, high $NO_X$ reduction efficiency is exhibited by the $NO_X$ purification catalyst being supported.

As described above, according to the above-described exemplary embodiments, the exhaust gas purification filter that is capable of exhibiting excellent $NO_X$ purification performance by supporting a catalyst can be provided.

Reference numbers indicate corresponding relationships with specific means according to embodiments described hereafter, and do not limit the technical scope of the present disclosure.

First Embodiment

An embodiment of an exhaust gas purification filter 1 will be described with reference to FIGS. 1 to 6. As shown in FIG. 1, the exhaust gas purification filter 1 includes a honeycomb structure portion 10 and a plug portion 16. For example, the honeycomb structure portion 10 may be made of by a ceramic, such as cordierite, and includes an outer shell 11, a partition wall 12, and a cell 13.

Figure 2:
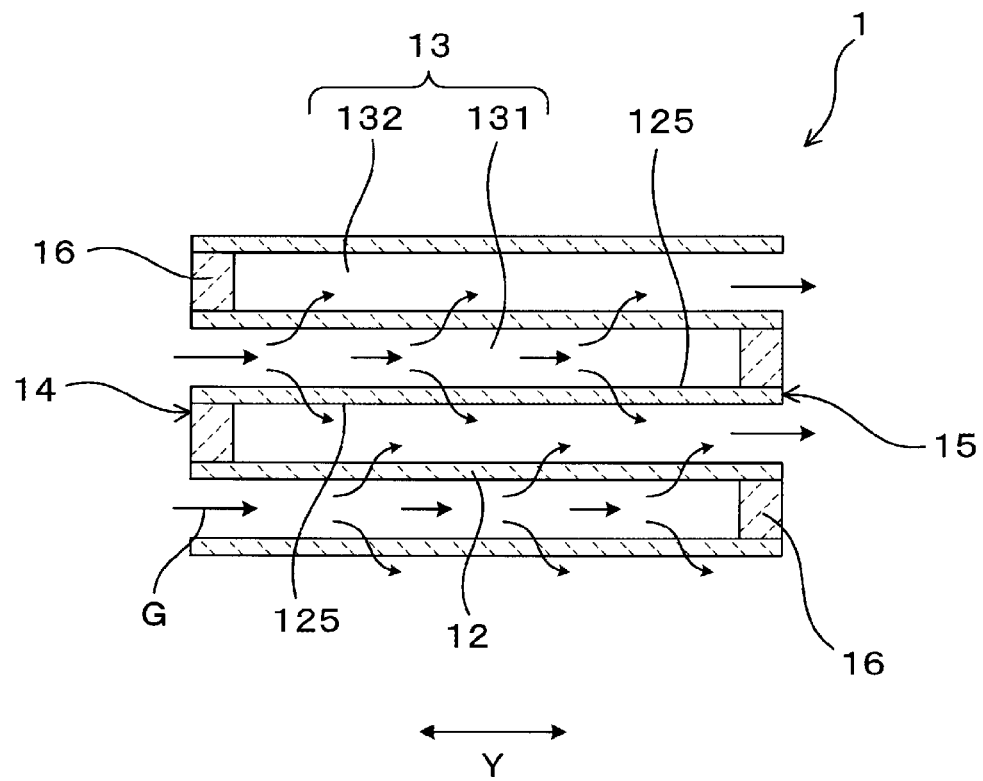
FIG. 2 is an enlarged cross-sectional view in an axial direction of the exhaust gas purification filter according to the first embodiment.

As shown in FIGS. 1 and 2, for example, the outer shell 11 may be a cylindrical body. For example, a specific shape of the outer shell 11 may be a circular cylinder of which a cross-sectional shape in a direction orthogonal to an axial direction Y of the outer shell 11 is a circle. However, the shape of the outer shell 11 may be a polygonal cylinder of which the cross-sectional shape is a polygon, such as a square. According to the present embodiment, the axial direction Y of this cylindrical outer shell 11 is described as the axial direction Y of the exhaust gas purification filter 1. The axial direction Y of the exhaust gas purification filter is referred to, as appropriate, as a filter axial direction Y. In addition, arrows in FIG. 2 indicate a flow of exhaust gas G when the exhaust gas purification filter 1 is arranged on a path of the exhaust gas G, such as in an exhaust pipe.

Figure 3:
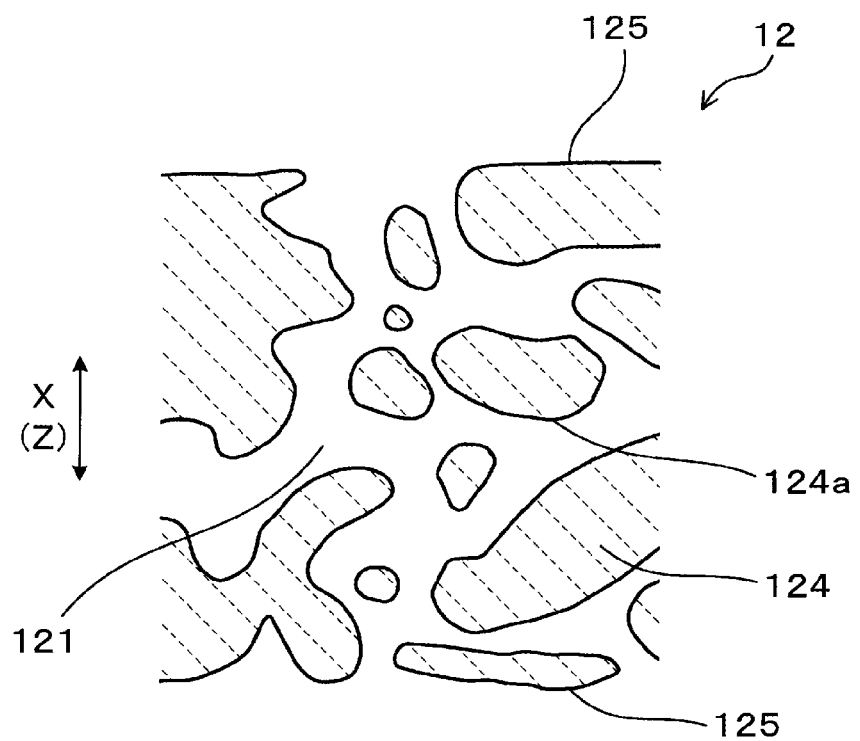
FIG. 3 is an enlarged cross-sectional schematic diagram of a partition wall according to the first embodiment.

The partition walls 12 partition an interior of the outer shell 11 into numerous cells 13. The partition wall 12 is also commonly referred to as a cell wall. For example, the partition walls 12 may be provided in a lattice shape. The exhaust gas purification filter 1 is a porous body. As shown in FIG. 3, numerous pores 121 are formed in the partition wall 12. Therefore, the exhaust gas purification filter 1 is capable of accumulating and collecting PM that is contained in the exhaust gas G on a surface of the partition wall 12 and inside the pore 121. The pore 121 is also commonly referred to as a pore. The PM is fine particles that are referred to as particulate substance, particulate matter, particulates, and the like. The outer shell 11 and the partition wall 12 are integrally formed.

As shown in FIGS. 1 and 2, the exhaust gas purification filter 1 includes numerous cells 13. The cell 13 is surrounded by the partition walls 12 and forms a flow path for the exhaust gas G. An extending direction of the cell 12 ordinarily coincides with the filter axial direction Y.

For example, a cell shape on a filter cross-section in a direction orthogonal to the filter axial direction Y may be a square. However, this is not limited thereto. The cell shape may be a polygon such as a triangle, a square, or a hexagon, a circle, or the like. In addition, the cell shape may be a combination of two or more differing types of shapes.

The exhaust gas purification filter 1 is used so as to support (carry) a $NO_X$ purification catalyst. That is, the exhaust gas purification filter 1 before a catalyst is supported may be a substrate for supporting the $NO_X$ purification catalyst. The $NO_X$ purification catalyst is supported on at least the partition wall 12. The exhaust gas purification filter 1 may have a support surface for supporting the $NO_X$ purification catalyst on the partition wall 12. For example, the support surface may be a flow path surface 125 and a pore wall surface 124a shown in FIGS. 2 to 5B. The flow path surface 125 is a portion in which the partition wall 12 faces the cell 13. The pore wall surface 124a is a portion in which a pore wall 124 faces the pore 121. The $NO_X$ purification catalyst is supported on the partition wall 12 as a catalyst layer 17.

For example, the exhaust gas purification filter 1 may be a columnar body that has a circular columnar shape or the like, and dimensions thereof can be changed as appropriate.

The exhaust gas purification filter 1 has an inflow end surface 14 and an outflow end surface 15 on both ends in the filter axial direction Y. The inflow end surface 14 is an end surface on a side on which the exhaust gas G flows in a state in which the exhaust gas purification filter 1 is arranged in the flow of the exhaust gas G, and the outflow end surface 15 is an end surface on a side on which the exhaust gas G flows out.

In a state in which the exhaust gas purification filter 1 is not arranged in the flow of the exhaust gas G, the inflow end surface 14 and the outflow end surface 15 refer to relative surfaces in the filter axial direction Y. That is, when either of the end surface is the inflow end surface 14, the other is the outflow end surface 14. For example, the inflow end surface 14 can also be referred to as a first end surface and the outflow end surface 15 may be referred to as a second end surface.

The exhaust gas purification filter 1 includes a plug portion 16. For example, the plug portions 16 may seal the inflow end surface 14 or the outflow end surface 15 of the cells 13 in an alternating manner. For example, the plug portion 16 may be made of a ceramic, such as cordierite. However, other materials are also possible.

In FIG. 2, a plug-shaped plug portion 16 is formed. However, the shape of the plug portion 16 is not particularly limited as long as the inflow end surface 14 or the outflow end surface 15 can be sealed. Here, although an illustration of a configuration is omitted, for example, the plug portion 16 can also be formed by a portion of the partition wall 12 being deformed on the inflow end surface 14 or the outflow end surface 15. In this case, because the plug portion 16 is formed by a portion of the partition wall 12, the partition wall 12 and the plug portion 16 are integrally and continuously formed.

For example, as the cells 13, a first cell 131 and a second cell 132 may be provided. As shown in FIG. 2, for example, in the first cell 131, the inflow end surface 14 that serves as an inflow side for the exhaust gas G may be open and the outflow end surface 15 may be sealed by the plug portion 16. For example, in the second cell 132, the outflow end surface 15 that serves as an outflow side for the exhaust gas G may be open and the inflow end surface 14 may be sealed by the plug portion 16.

For example, the first cells 131 and the second cells 132 may be formed in an alternately arrayed manner, so as to be adjacent to each other in a lateral direction X that is orthogonal to the filter axial direction Y and a vertical direction Z that is orthogonal to both the filter axial direction Y and the lateral direction X. That is, when the inflow end surface 14 or the outflow end surface 15 of the exhaust gas purification filter 1 is viewed from the filter axial direction Y, for example, the first cells 131 and the second cells 132 may be arranged in a checkered pattern.

As shown in FIG. 2, the partition walls 12 separate the first cell 131 and the second cell 132 that are adjacent to each other. As shown in FIG. 3, inside the partition wall 12, numerous pores 121 are formed by the pore walls 124. The pores 121 include a communicating pore 121c that communicates between the first cell 131 and the second cell 132, and a non-communicating pore (not shown) that does not communicate therebetween. For example, the communicating pore 121c may be confirmed through electron microscope observation of a partition wall cross-section by a scanning electron microscope or the like.

In FIG. 3, the pores 121 are shown so as to be simplified into a two-dimensional form. However, it is though that most of the pores 121 intersect in a three-dimensional manner. The pores 121 serve as paths for the exhaust gas G inside the partition wall 12. As a result of the exhaust gas G passing through the pores 121, the PM in the exhaust gas G is collected on the pore wall surfaces 124a. In addition, as a result of the pore walls 124 supporting the $NO_X$ purification catalyst, toxic gas components such as $NO_X$ that are contained in the exhaust gas G that passes through the pores 121 are reduced by the $NO_X$ purification catalyst. The cells 13 also serve as paths for the exhaust gas G in a manner similar to the pores 121. The PM is also collected on the flow path surfaces 125 of the partition walls 12. As a result of the flow path surfaces 125 supporting the $NO_X$ purification catalyst, the $NO_X$ is also reduced on the flow path surfaces 125.

Figure 4:
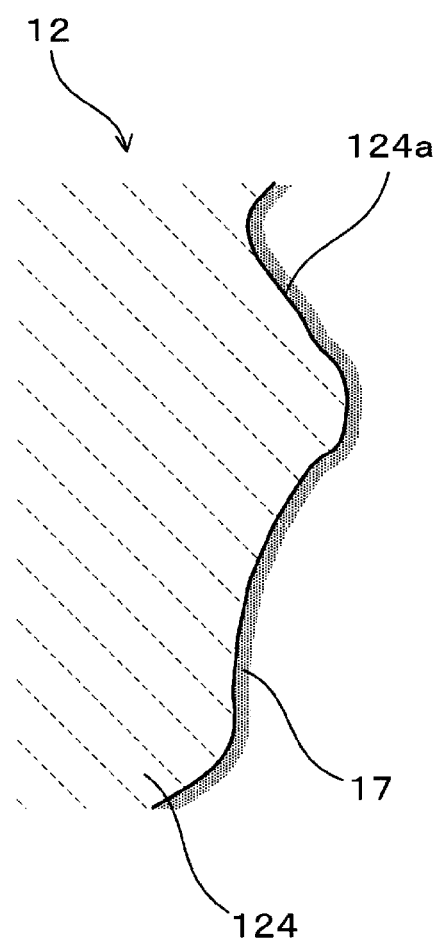
FIG. 4 is an enlarged cross-sectional schematic diagram of a pore wall on which a $NO_X$ purification catalyst is supported according to the first embodiment.
Figure 5A:
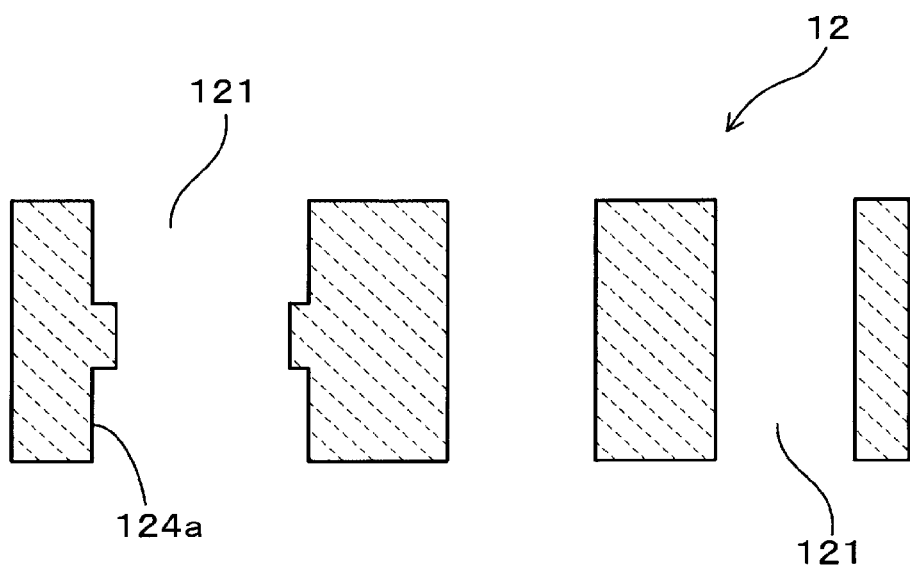
FIG. 5A is a schematic diagram of a simplified cross-section of the partition wall according to the first embodiment.
Figure 5B:
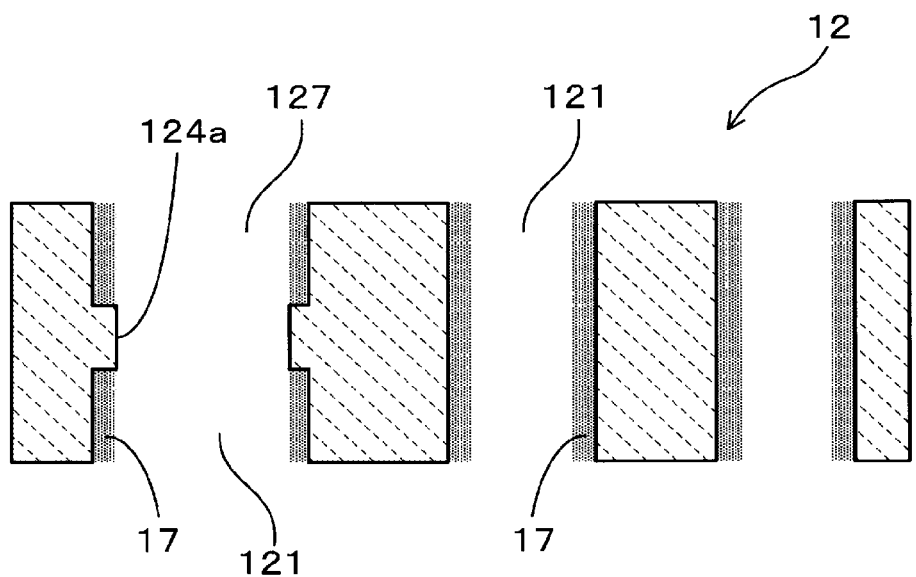
FIG. 5B is a schematic diagram of a simplified cross-section of the partition wall on which the $NO_X$ purification catalyst is supported according to the first embodiment.

As shown in FIG. 4, for example, the catalyst layer 17 may be formed on the pore wall surface 124a of the partition wall 12. The catalyst layer 17 may be formed in a continuous manner or a non-continuous manner. For example, the catalyst layer 17 may be also formed on the flow path surface 125 of the partition wall 12.

As a result of the communicating pores being increased as appropriate, reduction of pressure loss and improvement in PM collection efficiency can both be achieved. Pressure loss is referred to, hereafter, as "pressure loss", as appropriate. A quantity, shape, and the like of the communicating pores can be adjusted with porosity, average pore diameter, and the like as indicators. From a perspective of appropriately increasing the communicating pores and from a perspective of maintaining strength of the exhaust gas purification filter 1, the porosity is preferably 50 to 70%, more preferably 55 to 65%, and even more preferably 60 to 65%. The porosity is measured based on principles of a mercury injection method, as described in an experiment example.

The catalyst layer 17 contains the $NO_X$ purification catalyst. As the $NO_X$ purification catalyst, a three-way catalyst that is composed of precious metals, such as Pt, Rh, and Pd may be used. In this case, the $NO_X$ purification catalyst can further purify toxic gas components such as CO and HC, in addition to $NO_X$. The catalyst layer 17 may also further contain alumina, an auxiliary catalyst, and the like. As the auxiliary catalyst, ceria, zirconia, a ceria-zirconia solid solution, and the like may be used as examples.

A formation method for the catalyst layer 17 is not particularly limited. However, for example, a method in which the partition wall 12 is impregnated with a fluid that contains a catalyst such as a noble metal and baked may be common. For example, the fluid may be a liquid such as a catalyst slurry.

Because the diffusion rate of $NO_X$ in the catalyst layer is slow, when the catalyst layer is thick, diffusion of $NO_X$ in the catalyst layer is insufficient. $NO_X$ reduction efficiency increases by the catalyst layer 17 being thinly and widely formed on the pore wall surfaces 124a and the like. A reason for this is as follows.

For example, when a predetermined amount of the catalyst layer 17 is formed in the exhaust gas purification filter 1, as a result of the catalyst layer 17 being thinly formed, the catalyst layer 17 is formed in a wide area of the pore walls 124. Therefore, in the exhaust gas purification filter 1, contact frequency between the catalyst layer 17 and the $NO_X$ increases, and the $NO_X$ is more easily reduced.

In addition, because the diffusion rate of $NO_X$ in the catalyst layer 17 is slow, purification may be sufficiently performed even when thickness of the catalyst layer 17 is small. During catalyst layer formation, the pore 121 forms flow paths for a fluid such as the catalyst slurry. As a result of the flow path resistance thereof being reduced, the fluid flows more easily, and the catalyst layer 17 is thinly and widely formed.

For example, to reduce the flow path resistance, increasing the pore diameter in the narrow portion 127 of the pore 121, increasing an average pore diameter, or increasing pores 121 that have a large pore diameter is effective. The narrow portion 127 is a portion in which the pore diameter is smaller than that in the periphery. For example, the narrow portion 127 may be a narrowed portion of the pore 121 on a partition wall cross-section in a wall thickness direction. As a result of the narrow portion 127 being increased, a gas permeability coefficient of the partition wall 12 can be increased. In addition, as a result of the pores 121 that have a small pore diameter being reduced, the pores 121 that have a large pore diameter can be increased.

To sufficiently improve the $NO_X$ reduction efficiency by thinly and widely forming the catalyst layer 17, it is effective to increase the gas permeability coefficient of the partition wall 12 to be equal to or greater than a predetermined value, increase the average pore diameter to be equal to or greater than a predetermined value, and reduce the pores 121 that have a small pore diameter to be equal to or less than a predetermined value. Specifically, as a result of the gas permeability coefficient being equal to or greater than $0.35 \times 10^{-12}$ $m^2$, the average pore diameter being equal to or greater than 12 μm, and a pore volume ratio of pore diameters of 9 μm or less than being equal to or less than 25%, the $NO_X$ reduction efficiency can be sufficiently increased.

In addition, as a result of the flow path resistance being reduced, the catalyst layer 17 can be thinly formed in a wider area even with the same coating amount. Therefore, because the $NO_X$ reduction efficiency can be improved without the coating amount of the catalyst layer 17 being increased, the $NO_X$ reduction efficiency can be improved while increase in pressure loss is suppressed. In addition, the $NO_X$ purification performance after a catalyst is supported can be improved by pore control of the exhaust gas purification filter 1 that serves as a carrier for the $NO_X$ purification catalyst.

For example, the catalyst layer 17 may be thinly and widely formed on the pore wall surfaces 124a and the like by the above-described common formation method using a catalyst slurry, and the exhaust gas purification filter 1 after a catalyst is supported exhibits excellent $NO_X$ purification performance. Measurement and calculation methods for the gas permeability coefficient, the average pore diameter, and the pore volume ratio are described in the experiment example. The pore volume ratio refers to a proportion of a volume of the pores 121 that have a predetermined pore diameter in relation to an overall pore volume, and is calculated from a pore diameter distribution that is measured based on the principles of the mercury injection method as described in the experiment example.

From a perspective of suppressing worsening of the PM collection efficiency, the gas permeability coefficient is preferably equal to or less than $3.0 \times 10^{-12}$ $m^2$, more preferably equal to or less than $2.5 \times 10^{-12}$ $m^2$, and even more preferably equal to or less than $2.0 \times 10^{-12}$ $m^2$, When the gas permeability coefficient is too high, the exhaust gas easily slips through inside the partition wall 12, and the collection efficiency is thought to become worse because more PM contained in the exhaust gas also slips through. From a similar perspective, the average pore diameter is preferably equal to or less than 25 μm, more preferably equal to or less than 23 μm, and even more preferably equal to or less than 20 μm. Because the PM more easily slips through when the average pore diameter is too large as well, the collection efficiency is thought to worsen.

A pore wall area per unit volume of the partition wall 12 is preferably equal to or greater than 70000 $\mu m^2/\mu m^3$. In this case, an area of the pore wall surface 124a that serves as the support surface on which the catalyst layer is formed is sufficiently large. Therefore, for example, when the same amount of catalyst is supported, the catalyst layer may be more thinly and widely formed. Consequently, the $NO_X$ that has a slow diffusion rate is efficiently reduced in the catalyst layer and the reduction efficiency is improved.

From a perspective of improving the $NO_X$ reduction efficiency, the pore wall area per unit volume of the partition wall 12 is more preferably equal to or greater than 85000 $\mu m^2/\mu m^3$, and even more preferably equal to or greater than 90000 $\mu m^2/\mu m^3$. Meanwhile, from a perspective of further improving the $NO_X$ reduction efficiency, the pore wall area per unit volume of the partition wall 12 is preferably equal to or less than 200000 $\mu m^2/\mu m^3$, more preferably equal to or less than 190000 $\mu m^2/\mu m^3$, and even more preferably equal to or less than 180000 $\mu m^2/\mu m^3$.

A reason for this is that, although the catalyst layer being thinly and widely formed as described above is advantageous in improving the $NO_X$ reduction efficiency, from a perspective of sufficiently maintaining a diffusion distance (specifically, a reaction time) of the $NO_X$, having a certain degree of thickness is thought to be advantageous. The pore wall area is an area of the pore wall surface 124a and is an area of a portion in which the pore wall 124 that forms the pore 121 faces the pore 121. For example, the pore wall area may also be referred to as a geometric surface area inside the partition wall 12. The pore wall area is referred to, hereafter, as "GSA", as appropriate. A measurement method for the GSA is described in the experiment example.

For example, the catalyst layer 17 may be formed in the exhaust gas purification filter 1. A supported amount of the catalyst layer 17 is preferably 30 to 150 g/L. In this case, sealing of the pores 121 by the catalyst layer 17 is suppressed while required purification performance is ensured.

An average thickness of the catalyst layer 17 is preferably equal to or less than 6 μm. In this case, $NO_X$ purification is more efficiently performed in the catalyst layer 17. A reason for this is that, for example, when a predetermined amount of the catalyst layer 17 is formed, the catalyst layer 17 may be formed in a wider area of the pore wall surface 124a when the catalyst layer 17 is formed with a small thickness, such as 6 μm, than when the catalyst layer 17 is formed with a large thickness. In the purification of $NO_X$ of which the diffusion speed is slow, the catalyst layer 17 being thinly and widely formed, rather than thickly and narrowly formed, is more advantageous.

As described above, $NO_X$ purification can be sufficiently efficiently performed as a result of the average thickness of the catalyst layer 17 being equal to or less than 6 μm. Therefore, the $NO_X$ purification performance further improves. From a perspective of further improving the $NO_X$ purification performance, the average thickness of the catalyst layer 17 is more preferably equal to or less than 5 μm. In addition, when the thickness of the catalyst layer 17 is too thin, from a perspective of risk of decrease in the $NO_X$ purification performance, the average thickness of the catalyst layer 17 is preferably equal to or greater than 2 μm. For example, the average thickness of the catalyst layer 17 can be adjusted by an amount of the catalyst slurry that is used during formation of the catalyst layer 17.

For example, the exhaust gas purification filter 1 according to the present embodiment may be manufactured in the following manner. First, a green body that contains cordierite formation raw materials is fabricated. The green body is fabricated by silica, talc, aluminum hydroxide, and the like being adjusted to form a cordierite composition, a binder such as methyl cellulose, a pore-forming material such as graphite, a lubricating oil, water, and the like being added as appropriate and mixed. Alumina and kaolin may be added to form the cordierite composition. As the silica, porous silica may be used.

In the cordierite formation raw materials, silica and talc may be pore formation raw materials 101. The pore formation raw material 101 is a material that forms the pores 121. The pore formation raw materials 101 produce a liquid phase component during firing, and the pores 121 are formed as a result. Meanwhile, in the cordierite formation raw materials, aluminum hydroxide, alumina, and kaolin may be aggregate raw materials 102. The aggregate raw material 102 is a material that forms a ceramic portion other than the pores 121.

Next, the green body is molded, dried, and fired. As a result, the honeycomb structure portion 10 is formed. The honeycomb structure portion 10 is a portion that is configured by the outer shell 11, the partition walls 12, and the cells 13. The plug portions 16 are formed after firing of the honeycomb structure portion 10 or before firing. Specifically, for example, the plug portions 16 may be formed by the end surfaces of the cells 13 in the honeycomb structure portion 10 after firing or a honeycomb-structured molded body before firing being alternately sealed using a slurry for formation of the plug portion and fired.

The catalyst layer 17 is formed in the honeycomb structure portion 10 before the formation of the plug portions 16 or the honeycomb structure portion 10 after the formation of the plug portions 16. The catalyst layer 17 is formed by the partition walls 12 being impregnated with the catalyst slurry that contains a noble metal, alumina, an auxiliary catalyst, and the like, and a solid component of the slurry being burned into the partition walls 12. During impregnation, for example, suction may be applied.

According to the present embodiment, because the gas permeability coefficient, the average pore diameter, and the pore volume ratio of pore diameters of 9 μm or less are adjusted to predetermined ranges, the flow path resistance of the catalyst slurry decreases. Therefore, the catalyst layer 17 is thinly and widely formed without the amount of catalyst being changed. As a result, the $NO_X$ that has a slow diffusion rate is efficiently reduced. To reduce the flow path resistance, for example, the narrow portion 127 may be made larger in the following manner.

In the molded body during firing, for example, it may be thought that there are portions in which the pore formation raw materials 101 and the aggregate raw materials 102 are arranged in patterns shown in FIGS. 6A to 6E.

Pattern in FIG. 6A and pattern in FIG. 6C are cases in which a plurality of pore formation raw materials 101a that have a large grain size are close to each other. Pattern in FIG. 6B is a case in which the pore formation raw materials 101a that have a large grain size and pore formation raw materials 101b that gave a small grain size are in contact. Pattern in FIG. 6D and pattern in FIG. 6E are cases in which the pore formation raw materials 101 are not in contact with each other, and the aggregate raw materials 102 are arranged between the pore formation raw materials 101. In pattern in FIG. 6D, aggregate raw materials 102a that have a large grain size are arranged between the pore formation raw materials 101. In pattern in FIG. 6E, aggregate raw materials 102b that have a small grain size are arranged between the pore formation raw materials 101.

When cases in which the narrow portion 127 is formed by the patterns of raw material arrangement shown as examples in FIGS. 6A to 6E are assumed, a size of the narrow portion 127 is as follows. As a result of the pore formation raw materials 101 being placed in contact with each other as shown in patterns in FIGS. 6A to 6C, the narrow portion 127 is enlarged and the large narrow portion 127 can be formed. Meanwhile, when the pore formation raw materials 101 and the aggregate raw materials 102 are placed in contact as shown in patterns in FIGS. 6D and 6E, the narrow portion 127 becomes small. For example, a medium-sized narrow portion 127 may be formed in pattern in FIG. 6D and a small-sized narrow portion 127 is formed in pattern in FIG. 6E.

Therefore, as a result of a contact pattern between the pore formation raw materials 101 and the aggregate raw materials 102 being controlled, the size of the narrow portion 127 can be adjusted. Specifically, through use of at least two types of pore formation raw materials 101 that have opposite positive and negative electric charges from each other, the pore formation materials 101 are more easily placed in contact with each other as in patterns in FIGS. 6A to 6C.

Therefore, the narrow portion 127 can be made larger. More specifically, for example, the pore formation raw materials 101 may be silica and talc. Silica can be imparted a positive (+) charge and talc can be imparted a negative (−) charge. The positive and negative may be interchanged therebetween. In addition, a portion of a mixture of silica and talc may be imparted a positive (+) charge and a portion or an entirety of the remaining mixture may be imparted a negative (−) charge. Electric charge may be imparted to all pore formation raw materials 101 used in the manufacture of the exhaust gas purification filter 1. Alternatively, a portion of the pore formation raw materials 101 may be imparted electric charge.

For example, to impart electric charge, an anionic dispersant or a cationic dispersant may be used. Specifically, the pore formation raw material 101 and the dispersant are mixed in advance. Mixing of the pore formation raw material 101 and the dispersant is referred to as pre-kneading. As a result of pre-kneading, the dispersant is attached to the pore formation raw material 101 and the pore formation raw material 101 is charged. A positively charged pore formation raw material 101 and a negatively charged pore formation raw material 101 are obtained. After pre-kneading, the pore formation raw material 101 to which the dispersant is attached, the aggregate raw material 102, and other raw materials are further mixed.

When a pre-kneading time is too long, connectivity between the pores 121 may be lost. Therefore, the pre-kneading time is preferably appropriately adjusted. In addition, when the grain size of the aggregate raw materials 102 surrounding the pore formation raw materials 101 increases, connectivity between the pores 121 may be lost. Therefore, a grain size ratio between the pore formation raw materials 101 and the aggregate raw materials 102 is also preferably appropriately adjusted.

The gas permeability coefficient, the average pore diameter, and the pore volume ratio of pore diameters of 9 μm or less can be controlled to the above-described desired ranges by the grain size ratio of the pore formation raw materials 101 and the aggregate raw materials 102, a type of the dispersant, an added amount of the dispersant, the pre-kneading time, rotation speed during extrusion, a drying time of clay, and the like being adjusted.

Comparative Example 1

Figure 7A:
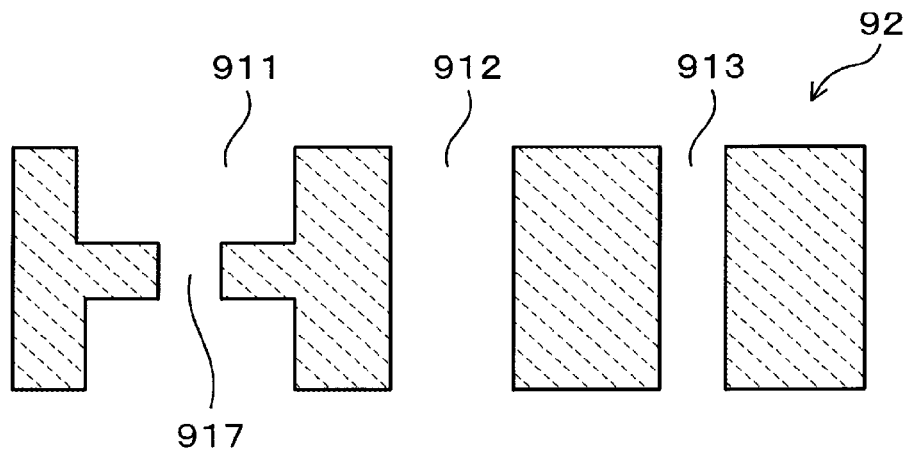
FIG. 7A is a schematic diagram of a simplified cross-section of a partition wall on which a small amount of an HC purification catalyst is supported in a comparative example 1, and FIGS. 7B and C are schematic diagrams of a simplified cross-section of a partition wall on which a large amount of the HC purification catalyst is supported in the comparative example 1.
Figure 7B:
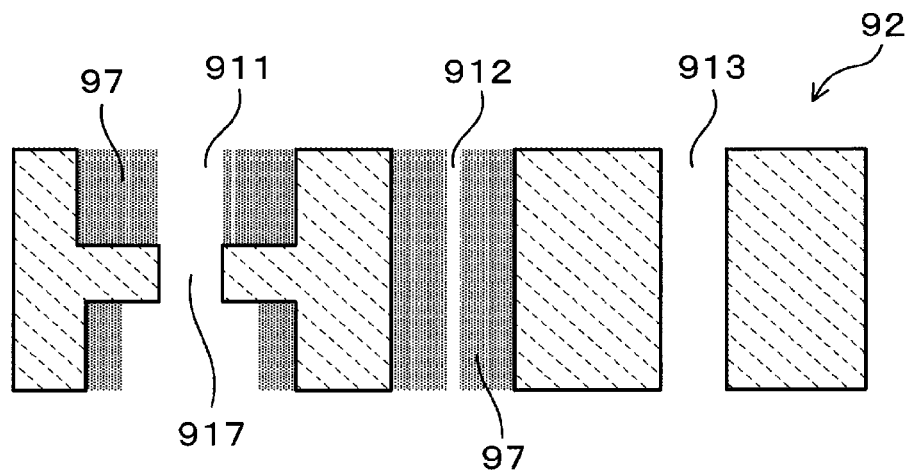
Figure 7C:
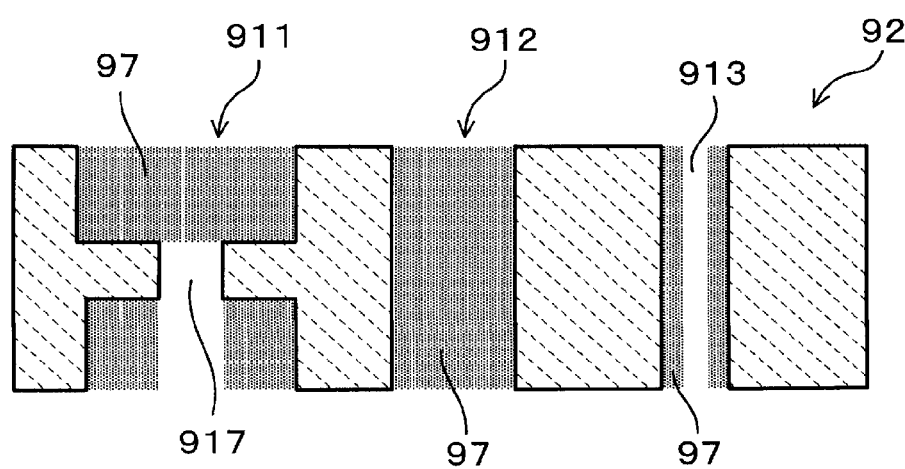

Next, an exhaust gas purification filter that has a narrow portion that has a small pore diameter will be described with reference to FIGS. 7A to 7C. FIGS. 7A to 7C show a partition wall 92 of the exhaust gas filter of the present example. FIGS. 7A to 7C schematically shows communicating pores (that is, pores 911, 912, and 913) of the partition wall 92 with simplified shapes.

As shown in FIG. 7A, in the partition wall 92 of the exhaust gas purification filter, various pores 911, 912, and 913 that have differing pore diameters are formed. In the present example, for convenience of description, the pores are described so as to be classified into three types: an hourglass-type pore 911 that has a large pore diameter and a narrow portion 917 that has a small pore diameter; a pore 912 that has a medium-sized pore diameter, and a pore 913 that has a small-sized pore diameter.

For example, when a predetermined amount of a catalyst layer 97 is formed on the partition wall 92 using a catalyst slurry, as shown in FIG. 7B, in the narrow portion 917 that has a high flow path resistance, the catalyst layer 97 that is partially thicker than that in the periphery may be formed. Meanwhile, in the pore 913 that has a small pore diameter, because the flow path resistance is high, the catalyst slurry does not easily enter the pore 913, and the catalyst layer 97 is difficult to form. Because the pore 913 that has a small pore diameter is advantageous for collection of PM, the PM collection efficiency increases by the small-sized pores being increased. However, the $NO_X$ purification performance after the catalyst layer 97 is supported decreases.

In addition, as shown in FIG. 7C, as a result of the supported amount of the catalyst being increased, the catalyst layer 97 can be formed in the pore 913 that has a small pore diameter. However, in this case, manufacturing cost increases by an amount of increase in the catalyst. Furthermore, in this case, because the narrow portions 917 and the medium-sized pores 912 are at least partially sealed by the catalyst layer 97, pressure loss increases.

Experiment Example 1

In a present example, as shown in Table 1, a plurality of exhaust gas purification filters 1 that have differing average pore diameters, gas permeability coefficients, and pore volume ratios of pore diameters of 9 μm or less are manufactured. In addition, the catalyst layer 17 that contains the $NO_X$ purification catalyst is formed on the partition walls 12 of the exhaust gas purification filters 1, and the $NO_X$ reduction efficiency, the PM collection efficiency, and the like are compared and evaluated.

Here, reference numbers used in the experiment example 1 and subsequent thereto that are the same as those used in earlier embodiments indicate constituent elements and the like that are similar to those according to the earlier embodiments unless otherwise stated.

The exhaust gas purification filter 1 has a circular columnar shape with a diameter of 118 mm and a length in the filter axial direction Y of 120 mm. A main ingredient of the exhaust gas purification filter 1 is cordierite. The exhaust gas purification filter 1 of the present example has 300 cpsi. A thickness of the partition wall 12 is 0.216 mm. The supported amount of the catalyst layer 17 is 65 g/L.

First, as the cordierite formation raw materials, silica, talc, and aluminum hydroxide were prepared. The silica and the talc are the pore formation raw material 101, and the aluminum hydroxide is the aggregate raw material 102.

A mixed powder of silica and talc was divided into two parts. An anionic dispersant and water were added to one part and mixed, and a cationic dispersant and water were added to the other part and mixed. In this manner, a slurry-like first mixture that contains the pore formation raw material 101 to which a negative (−) charge is imparted and a slurry-like second mixture that contains the pore formation raw material 101 to which a positive (+) charge is imparted were obtained.

An added amount of the anionic dispersant in the first mixture is 2 to 15 wt % in relation to a total amount of 100 wt % of silica and talc. An added amount of water is half an amount required to fabricate the green body. As the anionic dispersant, "NOPCOSPERSE 44-C" manufactured by Sanyo Chemical, Ltd. was used. In addition, an added amount of the cationic dispersant in the second mixture is 2 to 15 wt % in relation to a total amount of 100 wt % of silica and talc. The added amount of water is half the amount required to fabricate the green body. As the cationic dispersant, "NOPCOSPERSE 092" manufactured by Sanyo Chemical, Ltd. was used.

Next, the first mixture, the second mixture, aluminum hydroxide, a dispersant, and a lubricating oil were mixed and kneaded. In this manner, the green body was fabricated. As the dispersant, polyoxyethylene polyoxypropylene glyceryl ether that has an average molecular weight of 4550 was used. In the present example, porous silica was used as the silica in the cordierite formation raw material. The porous silica functions as a pore forming material. During fabrication of the green body, for example, graphite may be added as the pore forming material. The pore forming material provides a function for improving the porosity of the exhaust gas purification filter 1.

After the green body was extrusion-molded and fired at 1410° C., the plug portions 16 were formed, and the exhaust gas purification filter 1 was thereby obtained. In addition, the catalyst layer 17 was formed in the exhaust gas purification filter 1 in a manner similar to that according to the first embodiment. As a result of a $D_{50}$ grain size of the mixture of silica and talc (that is, the pore formation raw material) being changed within a range of 5 μm to 35 μm, for example, the average pore diameter of the exhaust gas purification filter 1 can be adjusted to a desired range that is equal to or greater than 12 μm.

In addition, as a result of the added amounts of the cationic and anionic dispersants being changed within a range of 1 to 15 wt %, for example, the gas permeability coefficient of the exhaust gas purification filter 1 can be adjusted to a desired range that is equal to or greater than $0.35 \times 10^{-12}$ $m^2$.

As a result of a stirring time of the first mixture and the second mixture, and the kneading time of the green body being respectively adjusted within a range of 5 minutes to 150 minutes, for example, the pore volume ratio of pore diameters of 9 μm or less can be adjusted to a desired range that is equal to or less than 25%. In the present example, ten types of exhaust gas purification filters 1 were obtained as shown in Table 1 through combinations of these adjustments.

Next, measurement values shown in Table 1 were examined by methods described hereafter for each exhaust gas purification filter 1. The measurement value is a value of a measurement sample that is taken from the exhaust gas purification filter 1. The measurement sample is taken from a sampling position in the exhaust gas purification filter 1 described below.

(Sampling Position of the Measurement Sample)

Figure 8A:
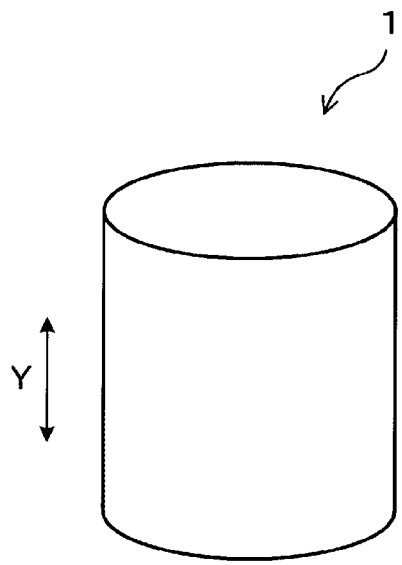
FIG. 8A is a schematic diagram of an outer shape of the exhaust gas purification filter in an experiment example 1.
Figure 8B:
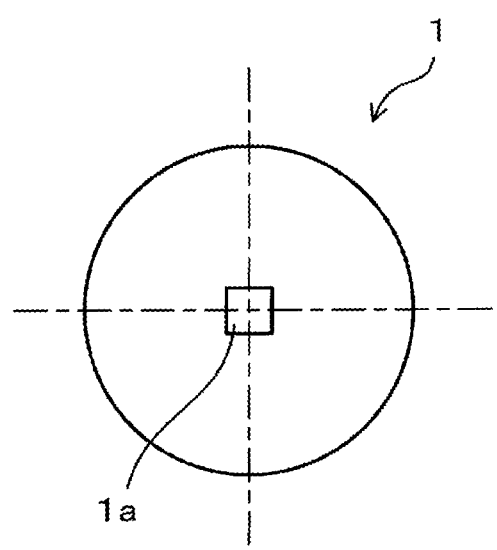
FIG. 8B is a schematic diagram (specifically, a cross-sectional view taken along line VIIIb-VIIIb in FIG. 8C) of a sampling position of a measurement sample in a radial direction of the exhaust gas purification filter in the experiment example 1.
Figure 8C:
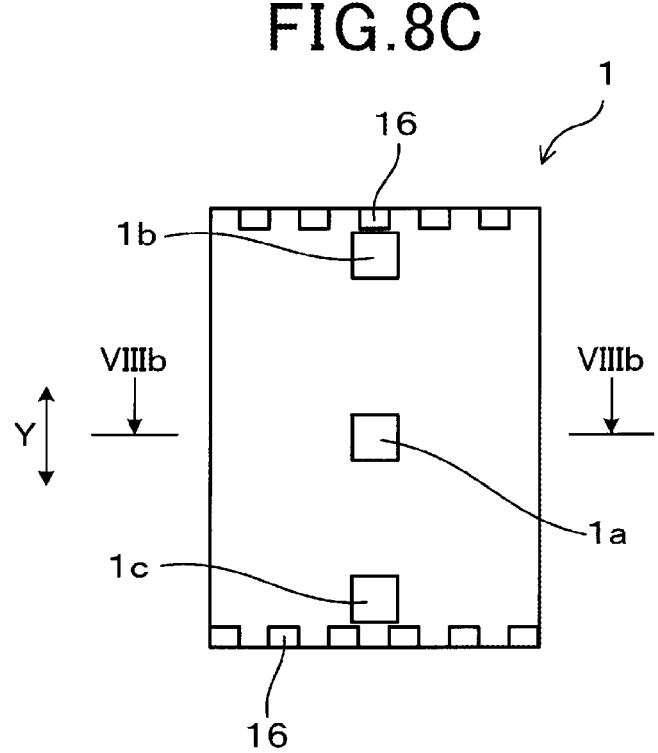
FIG. 8C is a schematic diagram of sampling positions of measurement samples in an axial direction and the radial direction of the exhaust gas purification filter in the experiment example 1.

The sampling positions are shown in FIGS. 8A to 8C. As shown in FIGS. 8A to 8C, the sampling positions are three sites: a center portion 1a in the filter axial direction Y that passes through a center portion of a diameter of the exhaust gas purification filter 1; a portion 1b just on an inner side of the plug portion 16 on the inflow end surface 14 side; and a portion 1c just on an inner side of the plug portion 16 on the outflow end surface 15 side. As shown in FIGS. 8A to 8C, the measurement samples are taken from the center of the exhaust gas purification filter 1 in a direction (specifically, the radial direction) orthogonal to the filter axial direction. A reason for this is that, because a gas flow rate is fast and the $NO_X$ easily blows through at the center, as a result of the gas permeability coefficient, the average pore diameter, the pore volume ratio of pore diameters of 9 μm or less, and the like being adjusted to the above-described predetermined ranges at at least the center, an improvement effect on the $NO_X$ reduction efficiency can be sufficiently exhibited. The measurement value shown in Table 1 is an arithmetic mean of the measurements at the three sites described above.

(Porosity and Average Pore Diameter)

Measurement was performed in a state in which the catalyst layer 17 is not formed, or specifically, on the exhaust gas purification filter 1 before catalyst layer formation. The measurement sample was taken from the partition wall 12 of the exhaust gas purification filter 1, and the porosity and the average pore diameter of the measurement sample were measured by a mercury porosimeter using the principles of the mercury injection method. The measurement sample is substantially a cube that has a length of 1 cm in the filter axial direction Y, a length of 1 cm in the wall thickness direction, and a length of 1 cm orthogonal to the filter axial direction and the wall thickness direction. The average pore diameter is also referred to as an average pore diameter. AutoPore IV9500 manufactured by Shimadzu Corporation was used as the mercury porosimeter.

Specifically, first, the measurement sample was housed inside a measurement cell of the mercury porosimeter, and an interior of the measurement cell was depressurized. Then, mercury was introduced into the measurement cell, and the measurement cell was pressurized. The pore diameter and the pore volume was measured based on pressure during pressurization and a volume of mercury that is introduced into the pores in the measurement sample.

The measurement was performed within a pressure range of 0.5 to 20000 psia. Here, 0.5 psia corresponds to $0.35 \times 10^{-3}$ kg/mm². 20000 psia corresponds to 14 kg/mm². A range of pore diameters that corresponds to this pressure range is 0.01 to 420 μm. As normal numbers for calculating the pore diameter from pressure, a contact angle of 140° and a surface tension of 480 dyn/cm were used. The average pore diameter is the pore diameter at 50% of an integrated pore volume. The porosity was calculated by the following relational expression.

porosity (%)=total pore volume/(total pore volume+
1/true specific gravity of cordierite)×100.

Here, a true specific gravity of cordierite is 2.52.

(Pore Volume Ratio of Pore Diameters of 9 μm or Less)

Measurement was performed in a state in which the catalyst layer 17 is not formed, or specifically, on the exhaust gas purification filter 1 before catalyst layer formation. The pore diameter distribution of each measurement sample was examined by a mercury porosimeter using the principles of the mercury injection method. The measurement was performed based on methods and conditions similar to those for the above-described porosity and average pore diameter. The volume ratio of the pores 121 that have pore diameters of 9 μm or less was determined from the pore diameter distribution.

(Gas Permeability Coefficient)

The gas permeability coefficient is determined from a relationship between gas flow rate and pressure loss. For example, the relationship between the gas flow rate and pressure loss may be measured by a measurement sample being fabricated from the exhaust gas purification filter 1 and measurement being performed based on the measurement sample. For measurement of the gas permeability coefficient, a measurement sample that has a circular columnar shape that has a diameter of 30 mm and a length in the filter axial direction Y of 25 mm, and a thickness of the partition wall 12 of 200 μm was used.

For example, the measurement sample may be the exhaust gas purification filter 1 that has a smaller outer dimension than an actual product for in-vehicle use and may be obtained by a filter of a desired dimension being cut out from an actual product. The sampling positions of the measurement samples are the three sites described above. For example, an outer shell of the filter that is cut out may be formed by cementing.

Next, polyester tape is attached to both end surfaces in the filter axial direction Y of the measurement sample. For example, the polyester tape may be partially removed by a soldering iron or the like such that the plug portions 16 that alternately seal the end surfaces as described above are formed by the polyester tape. That is, here, the plug portion 16 that is simulated by the polyester tape is formed.

Next, a gas is sent from the inflow end surface 14 to the outflow end surface 15 of the measurement sample, and the relationship between the gas flow rate and pressure loss is measured by a perm porometer. As the perm porometer, for example, a CEP-1100AXSHJ manufactured by Porous Materials, Inc. may be used. Specifically, the pressure loss when the gas flow rate is changed is measured by the perm porometer. Then, a relationship diagram of the gas flow rate (X-axis) and the pressure loss (Y-axis) is determined.

Figure 9:
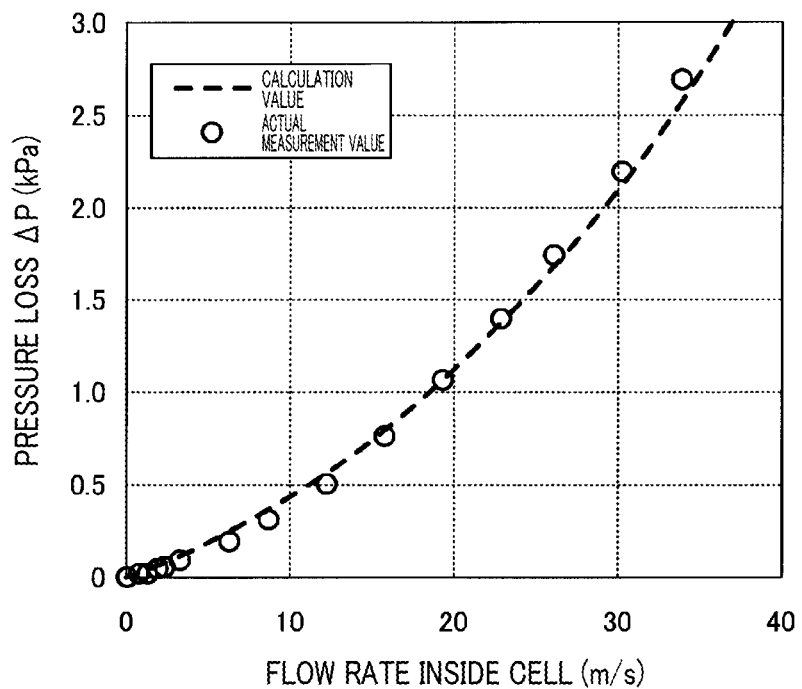
FIG. 9 is a graph of an example of a relationship between gas flow rate and pressure loss $\Delta P$ in the experiment example 1.

FIG. 9 shows an example of the relationship diagram of the gas flow rate (X-axis) and a pressure loss ΔP (Y-axis) within the cell 13. The relationship diagram indicates an actual measurement value (plot point) of the perm porometer and a calculation value (such as a broken line) determined by the following expressions (i) to (viii). Expressions (i) to (viii) will be described below.

The pressure loss ΔP (unit: Pa) in the exhaust gas purification filter 1, a sum $\Delta P_{inlet/exit}$ (unit: Pa) of condensed pressure loss $\Delta P_{inlet}$ when the gas flows into the cell 13 and expanded pressure loss $\Delta P_{exit}$ when the gas flows out of the cell 13, pressure loss $\Delta P_{channel}$ (unit: Pa) during passage of gas inside the cell 13, and pressure loss $\Delta P_{wall}$ (unit: Pa) during passage of gas in the partition wall 13 satisfy a relationship in the following expression (i).

$$\Delta P = \Delta P_{inlet/exit} + \Delta P_{channel} + \Delta P_{wall} \quad \text{(i)}$$

In addition, $\Delta P_{inlet/exit}$, an opening area $A_{open}$ (unit: m²) of the cell 13, an opening area $A_{in}$ (unit: m²) of the cell 13 on the inflow end surface 14 of the exhaust gas, a gas flow rate $V_{channel}$ (unit: m/s) inside the cell 13, and air density ρ (unit: kg/m³) satisfy a relationship in the following expression (ii).

$$\Delta P_{inlet/exit} = \left(1 - \frac{A_{open}}{A_{in}}\right)^2 \cdot \frac{1}{2}\rho V_{channel}^2 + \quad \text{(ii)}$$

-continued $$\left(0.04 - \left(\cfrac{1}{0.582 + \cfrac{0.0418}{1.1 - \left(\frac{A_{open}}{A_{in}}\right)^{-0.5}}}\right)\right)^2 \cdot \frac{1}{2}\rho V_{channel}^2$$

Furthermore, $\Delta P_{channel} + \Delta P_{wall}$, a gas permeability coefficient k (unit: $m^2$), a length L (unit: m) in the filter axial direction Y of the exhaust gas purification filter 1, a hydraulic diameter $a^1$ (unit: m) of the cell 13, a thickness w (unit: m) of the partition wall 12, a coefficient of friction F (unit: dimensionless) inside the cell 13, Reynold's number (unit: dimensionless), gas viscosity μ (unit: Pa·s), and the gas flow rate $V_{channel}$ (unit: m/s) inside the cell 13 satisfy relationships expressed by the following expressions (iii) to (viii). Here, in expression (iii), e is an exponential function exp.

$$\Delta P_{channel} + \Delta P_{wall} = \left\{ \frac{(e^{g_1}+1)(e^{g_2}+1)(g_2-g_1)}{4(e^{g_2}-e^{g_1})} + \frac{A_2}{2} \right\} \cdot \frac{\mu V_{channel} a_1 w}{4Lk} \quad \text{(iii)}$$

$$g_1 = A_1 - \sqrt{A_1^2 + 2A_2} \quad \text{(iv)}$$

$$g_2 = A_1 + \sqrt{A_1^2 + 2A_2} \quad \text{(v)}$$

$$A_1 = \frac{k}{a_1 w} \frac{4L}{a_1} \mathrm{Re} \quad \text{(vi)}$$

$$A_2 = \frac{4Fk}{a_1 w}\left(\frac{L}{a_1}\right)^2 \quad \text{(vii)}$$

$$\mathrm{Re} = \frac{\rho V_{channel} a_1}{\mu} \quad \text{(viii)}$$

A pressure loss value is calculated based on expressions (i) to (viii) above. The broken line formed by the calculation values shown in the relationship diagram of the gas flow rate (X-axis) and pressure loss (Y-axis) shown as an example in FIG. 9 is the pressure loss value determined by calculation. As is understood from expressions (i) to (viii), the pressure loss value is calculated by measuring the filter length L, the opening area $A_{open}$ of the cell 13, the hydraulic diameter $a^1$, and the thickness w of the partition wall 12, excluding the gas permeability coefficient k. These values do not change even when the gas flow rate is changed. Therefore, as a result of an arbitrary value being inputted to the gas permeability coefficient, the calculation values in the relationship drawing of the gas flow rate (X-axis) and pressure loss (Y-axis) can be derived.

For example, when a value that has a large gas permeability coefficient is inputted, the pressure loss value becomes lower than an actual measurement value. The calculation value falls below the actual measurement value. Meanwhile, when a value that has a small gas permeability coefficient is inputted, the calculation value exceeds the actual measurement value. Here, the gas permeability coefficient k at which the difference between the calculation value and the actual measurement value is minimum is calculated by a least-squares method such that the calculation value is approximated to be closest to the actual measurement value. The calculation value is the gas permeability coefficient k. That is, the gas permeability coefficient k is a value that is the gas permeability coefficient calculated back by expressions (i) to (viii) from the actual measurement value of the pressure loss measured by the perm porometer. (GSA)

Measurement was performed in a state in which the catalyst layer 17 is not formed, or specifically, on the exhaust gas purification filter 1 before catalyst layer formation. Continuous tomographic images of the partition wall 12 of the measurement sample taken from the exhaust gas purification filter 1 were acquired. The samplings positions are the three sites described above.

An X-ray computed tomography (CT) apparatus "Versa XRM-500" manufactured by Xradia, Inc. was used to capture the continuous tomographic images. Imaging conditions are voltage: 80 kV, step: 0.1°, and resolution: 0.684787 μm/pixel. For example, the continuous tomographic image may be in Tag Image File (TIF) format. The continuous tomographic images were loaded under a condition of 0.687478 μm/voxel using an importGeo-Vol function that is an interface of a micro-structure simulation software "GeoDict" manufactured by Math2Market GmbH.

Figure 10:
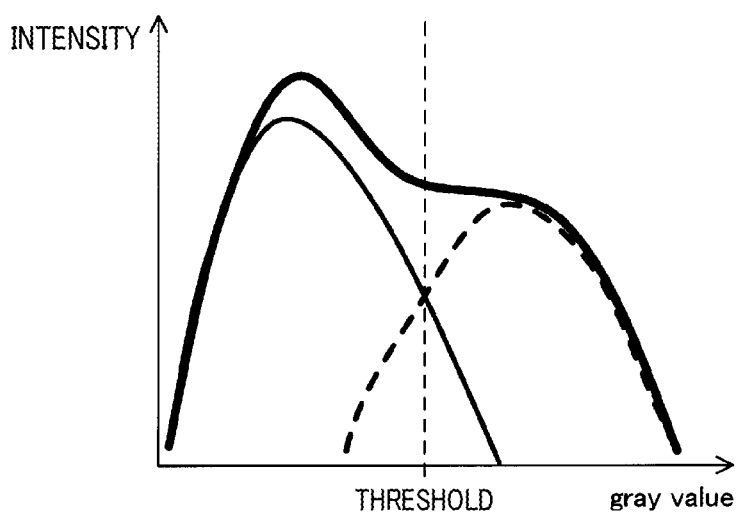
FIG. 10 is a diagram of a threshold for a binarization process in 3D modeling in the experiment example 1.

In addition, in order to separate an aggregate portion (specifically, the ceramic portion) and a space portion in the loaded image, three-dimensional (3D) modeling of the partition wall 12 was performed using, as a threshold, an intersecting portion between two separated peaks in a graph of gray values as illustrated in FIG. 10. Subsequently, noise was removed, and unnecessary portions were removed to achieve a desired size (in actuality, 900 voxel×600 voxel× partition-wall thickness voxel).

For a geometric surface area of the partition wall 12, Estimate Surface Area in a Porodict function that is a module of GeoDict was used, and analysis details were introduced from "Estimate of real surface area" in J. Ohser and F. Mücklich, Statistical Analysis Microstructures in Materials Science, Wiley and Sons, 2000, p. 115. Here, F. Mücklich above should correctly be written with an umlaut symbol above the "u". However, in the present specification, the name is written without the umlaut symbol. An average value of the measurement values at the three sites described above is given in Table 1 as the GSA.

(Average Thickness of the Catalyst Layer)

The average thickness of the catalyst layer is calculated from the average pore diameters of the exhaust gas purification filter before and after the catalyst is supported. Specifically, the average thickness of the catalyst layer is calculated from the following expression:

average thickness of the catalyst layer=(average pore diameter of the exhaust gas purification filter before the catalyst is supported−average pore diameter of the exhaust gas purification filter after the catalyst is supported)÷2.

An average value of ten exhaust gas purification filters was used as the average pore diameter. The sampling positions of the measurement samples of each exhaust gas purification filter are the three sites as shown in FIGS. 8A to 8C. Results of the calculation are shown in Table 1.

($NO_X$ Reduction Efficiency)

Figure 11:
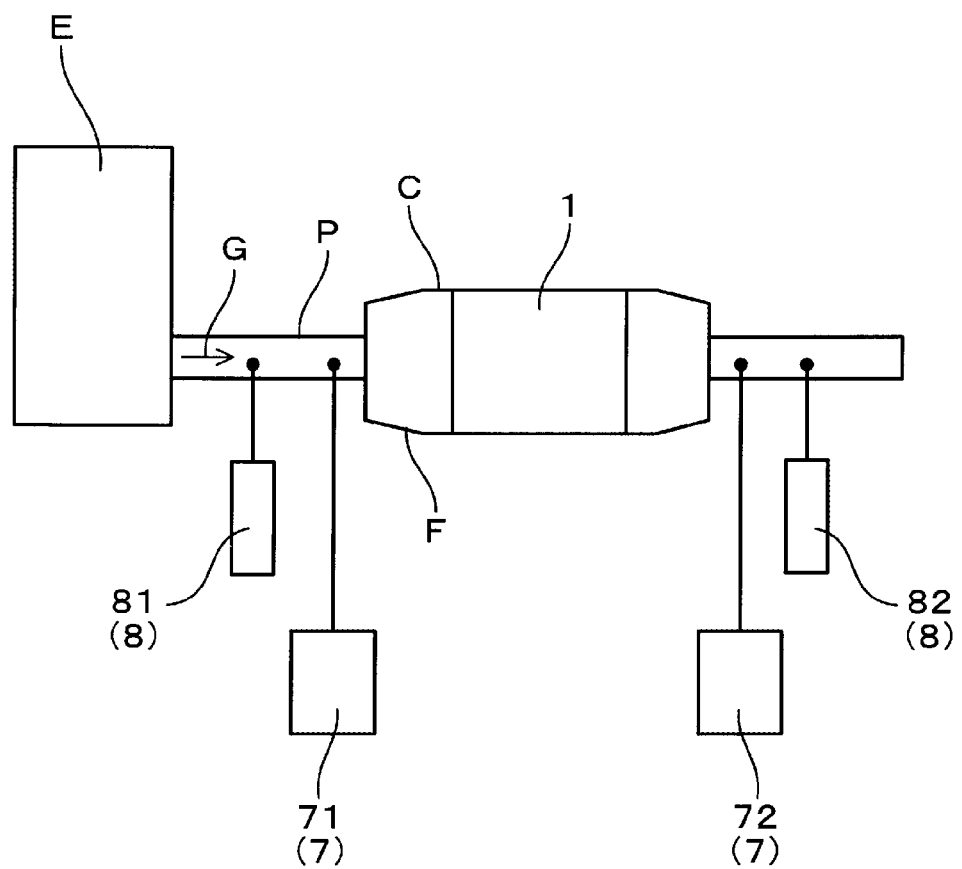
FIG. 11 is a schematic diagram of a configuration of a measurement apparatus for $NO_X$ reduction efficiency in the experiment example 1.

Measurement was performed in a state in which the catalyst layer 17 is not formed, or specifically, on the exhaust gas purification filter 1 before catalyst layer formation. As shown in FIG. 11, the exhaust gas purification filter 1 was attached inside an exhaust pipe P of a 2.0 L, naturally aspirated, four-cylinder, gasoline direct-injection engine E. Specifically, a ceramic mat (not shown) was wrapped around the exhaust gas purification filter 1, and the exhaust gas purification filter 1 was inserted into a filter case C.

Next, the filter case C was connected to the exhaust pipe P of the engine E with a fitting cone F therebetween, and the exhaust gas G was sent to the exhaust gas purification filter 1 from the engine E. Next, a value of A/F (that is, an air-fuel ratio: air/fuel) was controlled to 14.4 while being monitored by an A/F sensor 8, and a $NO_X$ concentration in the exhaust gas G was measured by a gas concentration meter 7 under conditions that an intake air amount is 10 g/s and a rotation speed of the engine E is 1500 rpm.

As the gas concentration meter 7, a first gas concentration meter 71 for measuring the $NO_X$ concentration on an entrance side before the exhaust gas G flows into the exhaust gas purification filter 1 and a second gas concentration meter 72 for measuring the $NO_X$ concentration on an exit side on which the exhaust gas G flows out from the exhaust gas purification filter 1 were used. The first gas concentration meter 71 and the second gas concentration meter 72 are both "MEXA-7500" manufactured by Horiba, Ltd.

In addition, as the A/F sensor 8, a first A/F sensor 81 for measuring an A/F concentration on the entrance side before the exhaust gas G flows into the exhaust gas purification filter 1 and a second A/F sensor 82 for measuring the A/F concentration on the exit side on which the exhaust gas G flows out from the exhaust gas purification filter 1 were used. A/F: 14.4 is an A/F value that is most frequent in Worldwide-harmonized Light vehicles Test Cycle (WLTC) mode traveling. The condition that the intake air amount is 50 g/s and the rotation speed of the engine E is 3500 rpm simulates driving conditions during high-load traveling.

For example, an exhaust gas temperature may reach a high-temperature region of 750° C. or higher. The $NO_X$ reduction efficiency is calculated from the $NO_X$ concentration on the entrance side measured by the first gas concentration meter 71 and the $NO_X$ concentration on the exit side measured by the second gas concentration meter 72, based on the following expression:

$NO_X$ reduction efficiency=100×($NO_X$ concentration on entrance side–$NO_X$ concentration on exit side)/$NO_X$ concentration on entrance side.

(PM Collection Efficiency)

Figure 12:
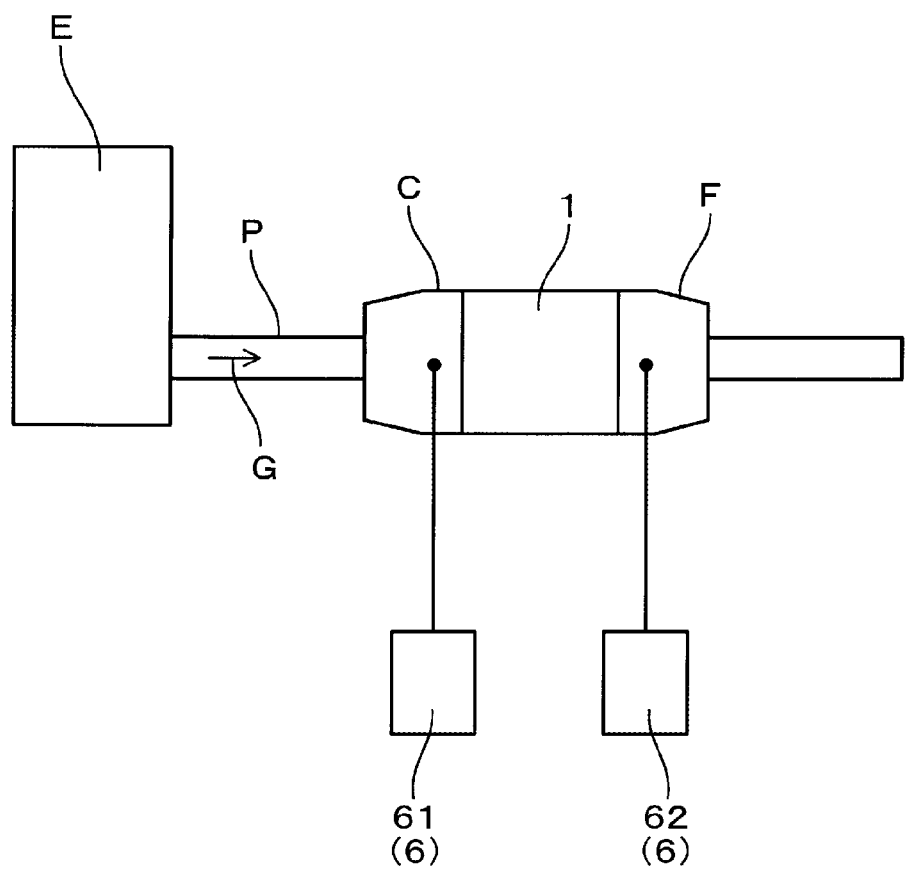
FIG. 12 is a schematic diagram of a configuration of a measurement apparatus for PM collection efficiency in the experiment example 1.

Measurement was performed in a state in which the catalyst layer 17 is not formed, or specifically, on the exhaust gas purification filter 1 before catalyst layer formation. As shown in FIG. 12, in a manner similar to that in the measurement of the $NO_X$ reduction efficiency, the exhaust gas purification filter 1 was attached inside the exhaust pipe P of the 2.0 L, naturally aspirated, four-cylinder, gasoline direct-injection engine E.

In addition, the exhaust G was sent to the exhaust gas purification filter 1 from the engine E. A PM concentration on the entrance side before the exhaust gas G flows into the exhaust gas purification filter 1 and a PM concentration on the exit side on which the exhaust gas G flows out from the exhaust gas purification filter 1 were measured by a PM sensor 6. Measurement conditions were a temperature of 720° C. and an exhaust-gas flow amount of 11.0 m³/min.

Both measurements were performed in an initial state in which the PM is not accumulated in the exhaust gas purification filter 1. The PM concentration on the entrance side was measured by a first PM sensor 61. The PM concentration on the exit side was measured by a second PM sensor 62. The PM collection efficiency is calculated from the PM concentration on the entrance side and the PM concentration on the exit side, based on the following expression:

PM collection efficiency=100(PM concentration on entrance side–PM concentration on exit side)/PM concentration on entrance side.

TABLE 1

| Example/comparative example No. | Porosity (%) | Average pore diameter (μm) | Gas permeability coefficient (×10¹² m²) | Pore volume ratio of pore diameters of 9 μm or less (%) | GSA (μm²/μm³) | Average thickness of catalyst layer (μm) | $NO_x$ reduction efficiency (%) | Collection efficiency (%) |
|---|---|---|---|---|---|---|---|---|
| Example 1 | 64 | 21.4 | 1.73 | 13 | 108056 | 5.0 | 96.2 | 73.0 |
| Example 2 | 64 | 27.0 | 3.50 | 12 | 95962 | 5.2 | 97.6 | 65.0 |
| Example 3 | 64 | 18.4 | 3.20 | 14 | 130945 | 5.2 | 97.4 | 69.2 |
| Example 4 | 64 | 26.0 | 2.02 | 20 | 93016 | 5.1 | 97.2 | 67.2 |
| Example 5 | 64 | 18.0 | 1.20 | 4 | 98132 | 5.4 | 86.0 | 73.0 |
| Example 6 | 64 | 18.0 | 0.80 | 12 | 88245 | 5.0 | 95.6 | 75.2 |
| Example 7 | 64 | 18.0 | 0.41 | 16 | 86849 | 3.9 | 90.8 | 81.6 |
| Example 8 | 64 | 12.2 | 0.35 | 17 | 85437 | 5.8 | 81.2 | 76.8 |
| Example 9 | 64 | 14.6 | 0.37 | 19 | 71004 | 4.4 | 85.3 | 77.4 |
| Example 10 | 64 | 18.0 | 0.35 | 17 | 70563 | 5.7 | 81.4 | 74.5 |
| Example 11 | 64 | 18.0 | 0.37 | 24 | 86784 | 5.4 | 82.4 | 78.9 |
| Example 12 | 64 | 18.7 | 1.74 | 13 | 130785 | 2.2 | 86.8 | 73.4 |
| comparative example 1 | 64 | 11.5 | 0.32 | 27 | 80945 | 8.2 | 50.3 | 76.5 |
| comparative example 2 | 64 | 11.0 | 0.22 | 21 | 77851 | 7.6 | 58.4 | 78.6 |
| comparative example 3 | 64 | 12.5 | 0.31 | 26 | 71004 | 7.2 | 63.2 | 77.4 |
| comparative example 4 | 64 | 11.6 | 0.38 | 28 | 68759 | 6.2 | 76.4 | 77.4 |
| comparative example 5 | 64 | 16.5 | 1.56 | 27 | 55647 | 6.5 | 74.1 | 77.4 |
| comparative example 6 | 64 | 11.2 | 0.48 | 24 | 94578 | 6.6 | 78.6 | 77.4 |
| comparative example 7 | 64 | 12.4 | 0.24 | 21 | 57843 | 6.3 | 73.3 | 77.4 |

Figure 13:
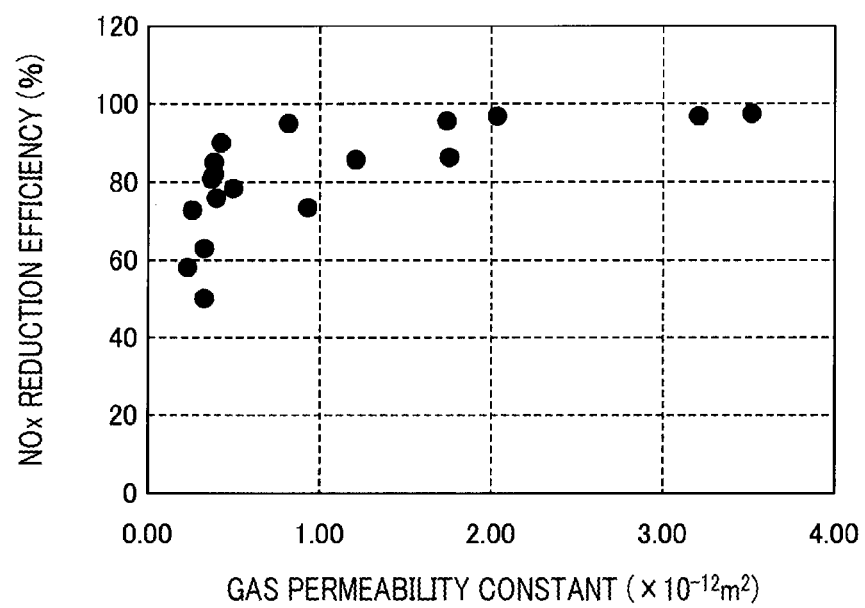
FIG. 13 is a graph of a relationship between a gas permeability coefficient and $NO_X$ reduction efficiency in the experiment example 1.
Figure 14:
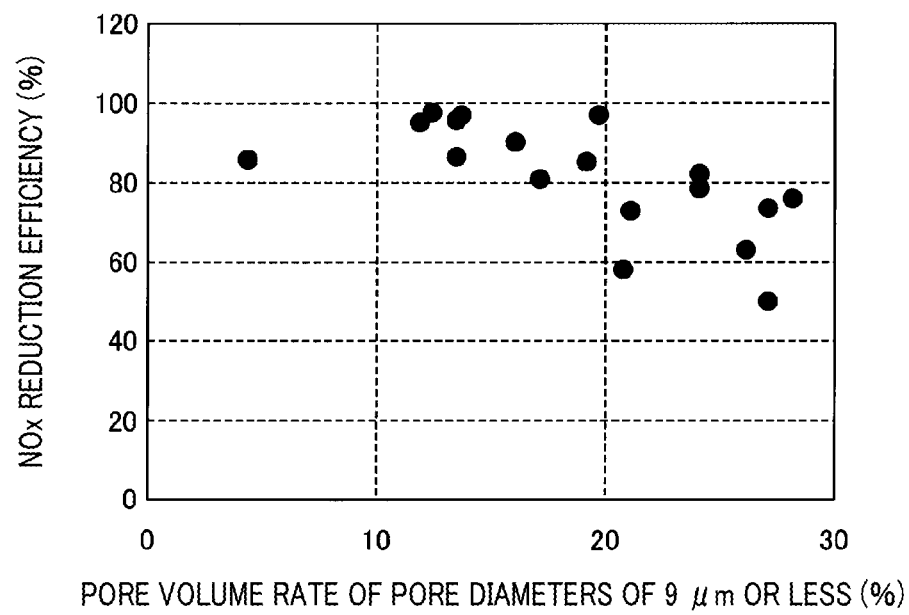
FIG. 14 is a graph of a relationship between pore volume ratio of pore diameters of 9 μm or less and $NO_X$ reduction efficiency in the experiment example 1.

As is clear from Table 1 and FIGS. 13 and 14, the exhaust gas purification filters 1 of the examples have a gas permeability coefficient that is equal to or greater than $0.35 \times 10^{-12}$ m², a pore volume ratio of pore diameters of 9 μm or less that is equal to or less than 25%, and an average pore diameter that is equal to or greater than 12 μm. Therefore, the $NO_X$ reduction efficiency is high in the examples. From a perspective of satisfying a reduction efficiency required as a U/F catalytic converter in a typical direct-injection engine, the $NO_X$ reduction efficiency is preferably equal to or greater than 80%. The U/F catalytic converter is also referred to as an under-floor catalyst. The U/F catalytic converter will be described according to a second embodiment.

Figure 15:
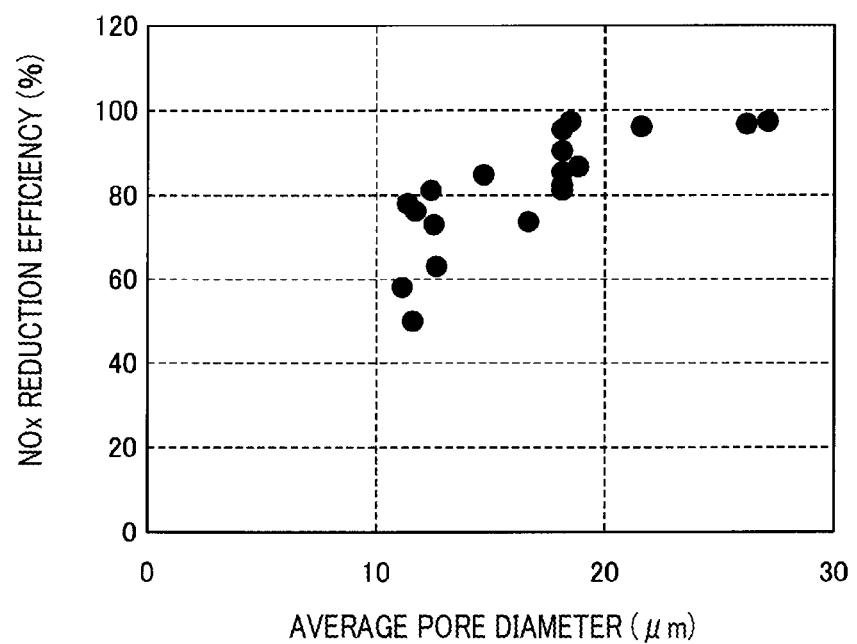
FIG. 15 is a graph of a relationship between average pore diameter and $NO_X$ reduction efficiency in the experiment example 1.

As is clear from Table 1 and FIG. 13, from the perspective of improving the $NO_X$ reduction efficiency, the gas permeability coefficient is equal to or greater than $0.35 \times 10^{-12}$ m². However, from the perspective of further improving the $NO_X$ reduction efficiency, the gas permeability coefficient is preferably equal to or greater than $0.40 \times 10^{-12}$ m² and more preferably equal to or greater than $0.80 \times 10^{-12}$ m². In addition, as is clear from Table 1 and FIG. 15, from the perspective of improving the $NO_X$ reduction efficiency, the average pore diameter is equal to or greater than 12 μm. However, from the perspective of further improving the $NO_X$ reduction efficiency, the average pore diameter is more preferably equal to or greater than 14 μm.

Furthermore, as is clear from Table 1 and FIG. 14, from the perspective of improving the $NO_X$ reduction efficiency, the pore volume ratio of pore diameters of 9 μm or less is equal to or less than 25%. However, from the perspective of further improving the $NO_X$ reduction efficiency, the pore volume ratio of pore diameters of 9 μm or less is preferably equal to or less than 20% and more preferably equal to or less than 15%. A reason for this is thought to be that, when the pore volume ratio of pore diameters of 9 μm or less is reduced, the pores 121 that exceed the pore diameter of 9 μm increase, and the catalyst layer 17 is thinly and widely formed by the catalyst being supported.

Moreover, as is clear from Table 1, from the perspective of suppressing the worsening of PM collection efficiency, the pore volume ratio of pore diameters of 9 μm or less is preferably equal to or greater than 3%, more preferably equal to or greater than 10%, and even more preferably equal to or greater than 15%. The pores 121 that have a pore diameter of 9 μm or less contribute greatly to the improvement of PM collection efficiency. Therefore, when the pores 121 that have a pore diameter of 9 μm or less are too few, PM collection performance may decrease.

As is clear from Table 1, the $NO_X$ reduction efficiency further improves when the pore wall area per unit volume (that is, the GSA) of the partition wall 12 is equal to or greater than 70000 μm²/μm³. From the perspective of further improving the $NO_X$ reduction efficiency, the GSA is more preferably equal to or greater than 85000 μm²/μm³, and even more preferably equal to or greater than 90000 μm²/μm³.

In contrast, in the comparative examples, a condition among the conditions that the gas permeability coefficient is equal to or greater than $0.35 \times 10^{-12}$ m², a pore volume ratio of pore diameters of 9 μm or less is equal to or less than 25%, and an average pore diameter is equal to or greater than 12 μm is not met. Therefore, the $NO_X$ reduction efficiency is low in the comparative examples.

Second Embodiment

Next, arrangement examples of the exhaust gas purification filter 1 will be described. According to a present embodiment, an arrangement example in a case in which the exhaust gas purification filter 1 is mounted in a vehicle is given. As shown in FIG. 15A, an S/C catalyst 1A (that is, a start catalyst) is arranged inside the exhaust pipe P, on an upstream side in a flow direction of the exhaust gas G that is discharged from the engine E.

For example, the S/C catalyst 1A may be a honeycomb structure that is formed from cordierite. Although an illustration of the configuration of the S/C catalyst 1A is omitted, the S/C catalyst 1A has a shape that is similar to the honeycomb structure portion 10 according to the first embodiment. Specifically, the S/C catalyst 1A includes the outer shell 11, the partition walls 12, and the cells 13, but does not include the plug portions. The honeycomb structure used in the S/C catalyst 1A is also referred to as a monolithic carrier. A three-way catalyst is supported in partition walls 12. Here, as the S/C catalyst, the exhaust gas purification filter 1 that includes the honeycomb structure portion 10 and the plug portions 16 can also be used.

Figure 16A:
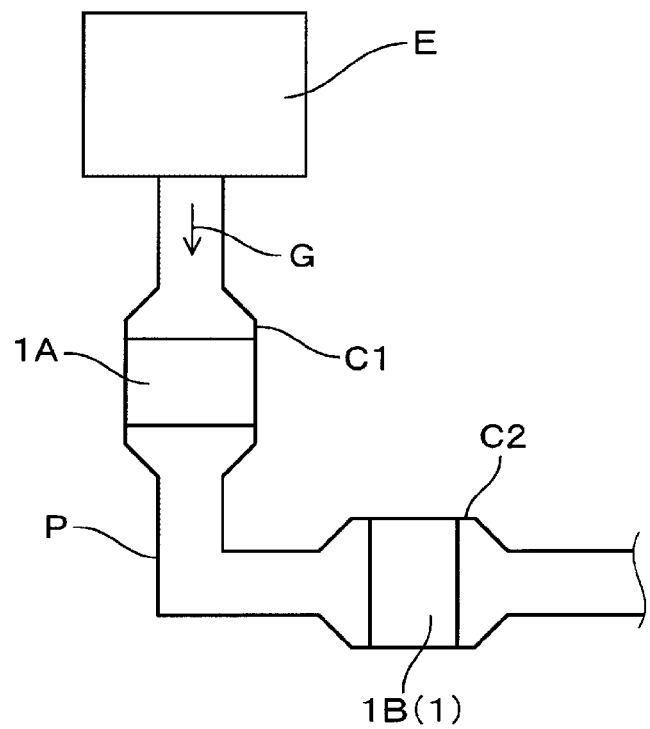
FIG. 16A is a schematic diagram of an example of an arrangement configuration of an exhaust gas purification filter according to a second embodiment and FIG. 16B is a schematic diagram of another example of the arrangement configuration of the exhaust gas purification filter according to the second embodiment.

As shown in FIG. 16A, a U/F catalytic converter 1B (that is, an under-floor catalytic converter) is arranged in a U/F position (that is, an under-floor position) that is under a floor of the vehicle downstream of the S/C catalyst 1A. For example, as the U/F catalytic converter 1B, the exhaust gas purification filter 1 according to the first embodiment may be used. The U/F catalytic converter 1B is also commonly referred to as a second converter.

The S/C catalyst 1A and the U/F catalytic converter 1B are respectively inserted into differing cases C1 and C2, and the cases C1 and C2 are connected to the exhaust pipe P. On a path of the exhaust pipe P, the S/C catalyst 1A and the U/F catalytic converter 1B are arranged a predetermined distance apart.

Figure 16B:
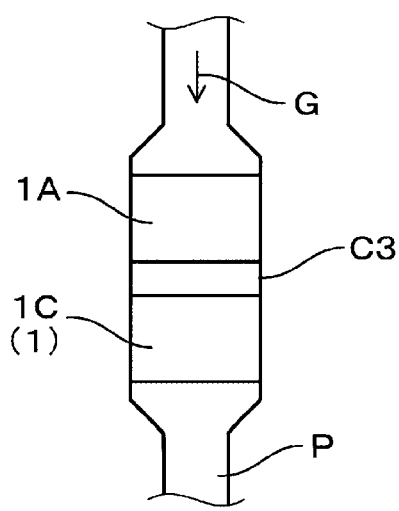

In addition, a tandem-type catalytic unit may be configured using the exhaust gas purification filter 1. Specifically, as shown in FIG. 16B, the S/C catalyst 1A and a rear catalyst 1C are inserted into the same case C3, and the case C3 is connected to the exhaust pipe P. For example, as the rear catalyst 1C, the exhaust gas purification filter 1 according to the first embodiment may be used.

The exhaust gas purification filter 1 is used as the U/F catalytic converter 1B, the rear catalyst 1C of the tandem-type catalytic unit, and the like, and is used on the downstream side of the S/C catalyst 1A that supports a three-way catalyst. In the S/C catalyst 1A that is arranged on the upstream side, toxic gas components such as CO, HC, and $NO_X$ are reduced by the three-way catalyst. Because the exhaust gas temperature is high, CO and HC are sufficiently reduced in the S/C catalyst 1A.

Meanwhile, in the U/F catalytic converter 1B or the rear catalyst 1C of the tandem-type catalytic unit that is arranged downstream of the S/C catalyst 1A, the $NO_X$ that had not been sufficiently reduced by the S/C catalyst 1A is mainly reduced. Because the exhaust gas purification filter 1 according to the first embodiment has excellent $NO_X$ purification performance, the exhaust gas purification filter 1 is suitable for the U/F catalytic converter 1B and the rear catalyst 1C of the tandem-type catalytic unit that are arranged on the downstream side of the S/C catalyst 1A.

The present disclosure is not limited to the above-described embodiments. Various embodiments are applicable without departing from the spirit of the invention. For example, although the exhaust gas purification filter 1 is used to purify the exhaust gas G of an internal combustion engine such as a diesel engine or a gasoline engine, the exhaust gas purification filter 1 may be suitable for application regarding emissions from a gasoline engine. That is, the exhaust gas purification filter 1 is preferably a gasoline particulate filter. The gasoline particulate filter is referred to as a GPF. The GPF requires not only PM purification performance, but also purification of toxic gas substances by being coated with a purification catalyst for toxic gas components such as $NO_X$.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. An exhaust gas purification filter comprising:
a substrate; and
a catalyst layer including a nitrogen oxide purification catalyst supported by the substrate, wherein
the substrate includes:
a honeycomb structure portion that includes a partition wall in which numerous pores are formed, and a plurality of cells that are partitioned by the partition walls and form a flow path for an exhaust gas; and
a plug portion that alternately seals an inflow end surface or an outflow end surface for the exhaust gas in the cells,
the partition wall has a gas permeability coefficient that is equal to or greater than $0.35 \times 10^{-12}$ m$^2$, a pore volume ratio of pore diameters of 9 μm or less that is equal to or less than 25%, and an average pore diameter that is equal to or greater than 12 μm,
the catalyst layer is supported on the partition wall of the substrate,
a supported amount of the catalyst layer is 30 to 150 g/L, and
an average thickness of the catalyst layer is equal to or less than 6 μm.

2. The exhaust gas purification filter according to claim 1, wherein
the gas permeability coefficient of the partition wall is equal to or less than $3.0 \times 10^{-12}$ m$^2$.

3. The exhaust gas purification filter according to claim 2, wherein
the pore volume ratio of pore diameters of 9 μm or less of the partition wall is equal to or greater than 10%.

4. The exhaust gas purification filter according to claim 3, wherein
the average pore diameter of the partition wall is equal to or less than 25 μm.

5. The exhaust gas purification filter according to claim 4, wherein
a pore wall area per unit volume of the partition wall is equal to or greater than 70000 μm$^2$/μm$^3$.

6. The exhaust gas purification filter according to claim 1, wherein
the pore volume ratio of pore diameters of 9 μm or less of the partition wall is equal to or greater than 10%.

7. The exhaust gas purification filter according to claim 1, wherein
the average pore diameter of the partition wall is equal to or less than 25 μm.

8. The exhaust gas purification filter according to claim 1, wherein
a pore wall area per unit volume of the partition wall is equal to or greater than 70000 μm$^2$/μm$^3$.

9. The exhaust gas purification filter according to claim 1, wherein
the nitrogen oxide purification catalyst is a three-way catalyst that is composed of precious metals.

10. The exhaust gas purification filter according to claim 1, wherein
the honeycomb structure portion is made of a ceramic.

* * * * *